Jan. 17, 1933.     A. HARRIS     1,894,464

LUGGAGE CARRIER

Filed Feb. 14, 1930

Inventor
A. Harris
by J. Edw. Maybee
ATTY.

Patented Jan. 17, 1933

1,894,464

UNITED STATES PATENT OFFICE

ALBERT HARRIS, OF TORONTO, ONTARIO, CANADA

LUGGAGE CARRIER

Application filed February 14, 1930. Serial No. 428,330.

This invention relates to luggage carriers and more particularly to that type used on running boards of automobiles, and my object is to provide a device of this character which is simple in construction, which may be readily collapsed and shifted inwardly beneath the running board when not in use, and which may be rigidly supported at any desired height whereby clearance for the door of the automobile may be provided when small pieces of luggage are being carried.

Figure 1:
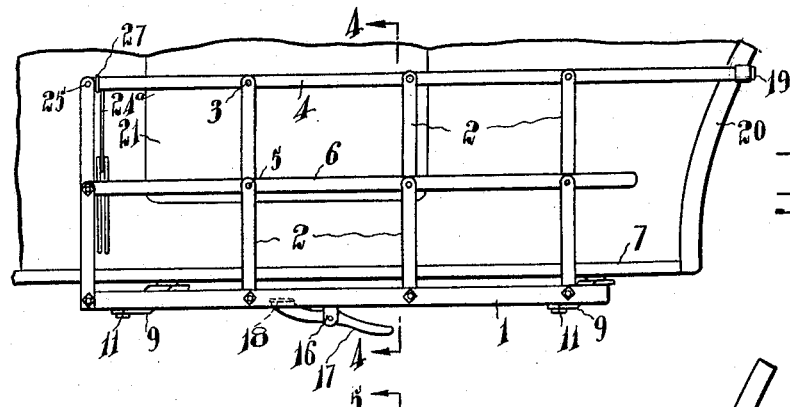
Figure 2:
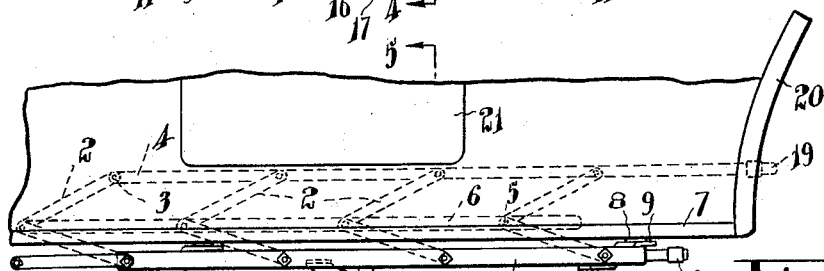

I attain my object by providing a rack which is collapsible in a vertical plane, and which is supported on a supporting member. This member is mounted to shift in a plane substantially parallel to the running board so that the member and the collapsed rack may be moved into an inoperative position beneath the running board. The rack includes an upper rail which is provided with a clamp for engagement with the adjacent fender of the automobile whereby the rack may be rigidly secured in variable raised positions. The constructions are hereinafter more fully described and are illustrated in the accompanying drawing in which Fig. 1 is a side elevation of my luggage carrier showing it in its extended position on a running board of an automobile;

Fig. 2, a view similar to Fig. 1, showing in full lines the carrier in its inoperative position, and showing in dotted lines the carrier partly extended to a position in which clearance is provided for the door on the automobile.

Figure 3:
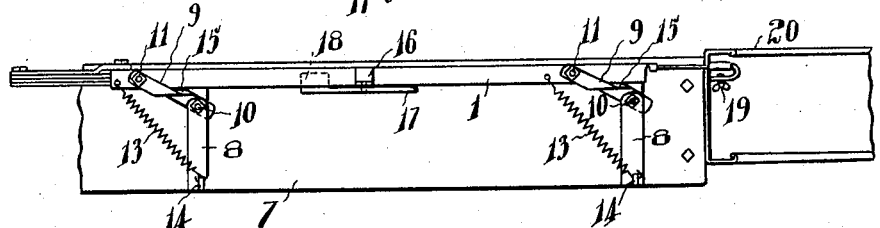
Figure 4:
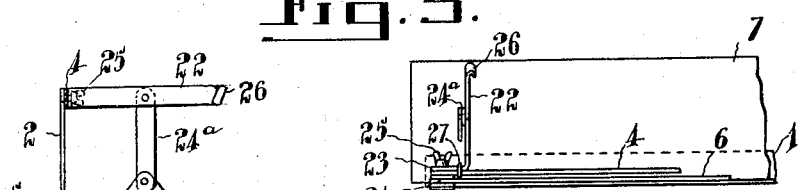
Figure 6:
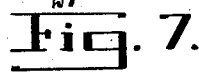
Figure 5:
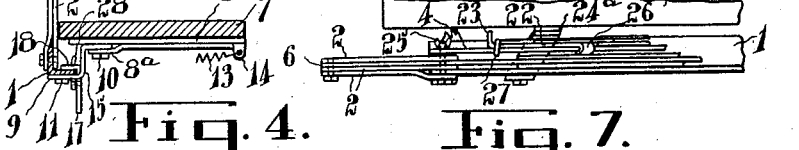

Fig. 3, a plan view of the underside of the running board, showing the carrier in its inoperative position;

Fig. 4, a cross section on the line 4—4 in Fig. 1;

Fig. 5, a cross section on the line 5—5 in Fig. 2;

Fig. 6, a detail in plan of the left hand end of the carrier in Fig. 1, showing the end guard in its operative position; and Fig. 7, a view similar to Fig. 6, showing the carrier collapsed, and the guard shifted to its inoperative position.

In the drawing, like numerals of reference indicate corresponding parts in the different figures.

A supporting member 1 which may be formed of angle iron carries the other parts of the luggage carrier. On the vertical flange of this member are pivoted a plurality of toggle links 2 which are pivotally connected at 3 with an upper rail 4, and at 5 with an intermediate rail 6. These parts form a collapsible rack adapted when collapsed, to rest on the horizontal flange of the supporting member 1.

The supporting member is mounted on the usual running board 7 of an automobile, to shift in a plane substantially parallel to the running board so that the member and the collapsed rack may be moved to an inoperative position beneath the running board 7. On the underside of the running board are suitably secured a pair of straps 8, each of which is formed of a piece of sheet metal bent backwardly on itself to form a jaw $8^a$ adapted to receive an end of an arm 9. Bolts or rivets 10 passed through the jaws and the ends of the arms carried thereby form pivots for the arms which are offset for pivotal connection at 11 with the underside of the supporting member 1. Springs 13, each having one end connected with the member 1 and the other end with a lug 14 formed integral with a strap 8, tend to swing the member to its inoperative position beneath the running board. This position is determined by the engagement of the member with the offset portions 15 of the arms 9 which portions are so bent that they will be parallel to the member when it is in its inoperative position. With this construction the stops formed by the offset portions 15 will have a maximum bearing face for engagement with the member.

To facilitate the removal of the collapsed rack from the supporting member 1, I provide a lifter. The latter is pivoted on a lug 16 depending from the underside of the member, and is provided with a handle 17 and an end 18, which is bent and weighted to normally rest on the horizontal flange of the member 1. The end 18 of the lifter is thus positioned between the said member flange and the rack when it is collapsed. By pressing the handle 17 downwardly, the end 18 is raised to lift the rack parts into a position above the top edge of the vertical flange of the member 1, where they may be readily grasped by the hands of the operator.

The upper rail 4 of the rack is provided with a suitable clamp 19 for engagement with a suitable stationary part, such as a fender 20 of the automobile. The upper end of the rack is thus rigidly held in any desired raised position, and the springs 13 tend to hold the lower ends of the links 2 against the outer edge of the running board 7. When small pieces of luggage are being carried, the rail 4 may thus be lowered to permit the opening of the automobile door 21 (see Fig. 2).

A guard removably carried on the forward end of the rail 4 is adapted to be moved into position to block the opening between the forward end of the rack and the side of the automobile body. The guard includes a bar 22 provided with an end 23 bent at right angles thereto, and this end is bifurcated for readily locking it on a bolt 24 by a wing nut 25. The guard also includes a depending extension 24$^a$ formed of pivoted parts adapted to be extended to an inverted Y shape, see Fig. 4, and to be folded to lie parallel to the bar 22, see Fig. 7. The bar 22 is provided with a hook 26 and a ring 27 for supporting it on the rail 4 when the guard is not in use as illustrated in Fig. 7 and hereinafter more fully described.

Assuming it is desired to use the carrier which normally lies beneath the running board, the operator merely swings the supporting member 1 outwardly, against the tension of the springs 13, until it clears the outer edge of the running board. He then depresses the handle 17 to lift the rack parts out from behind the vertical flange of the member 1, and grasps the rail 4. When the latter is raised sufficiently to permit the links 2 to engage the outer edge of the running board, it will not be necessary to hold the supporting member 1 to overcome the tension of the springs.

After the rail 4 is raised to the desired height and clamped to the fender 20, the hook 26 is lifted off the rail 4 and the bar 22 is swung away from the rail with the ring 27 acting as a fulcrum, so that the ring will engage the end 23 of the bar. The wing nut 25 is loosened to receive the bifurcated end 23 between the nut and the rail 4. The wing nut is then tightened, and the parts of the extension 24$^a$ are swung to their operative positions as indicated in Fig. 4. The end 23 of the bar 22 thus lies behind the rail 4 and the opposite extremities of the end 23 are supported by the wing nut 25 and the ring 27. The device is now ready for use, and may be returned to its inoperative position by folding up the parts of the extension 24$^a$, loosening the nut 25 and shifting the bar 22 so that the ring 27 engages the right angled corner thereof to permit the free end of the bar to be swung outwardly towards the rail 4. The hook 26 is then engaged with the upper edge of the rail 4 to support the free end of the bar 22 thereon. The rack is then collapsed, and the springs 13 return the member 1 to, and retain it against the stops 15.

The rack parts are snugly held by lugs 28 in position on the supporting member 1 so that they will not rattle.

I claim:

1. A collapsible luggage carrier including a supporting member; a rail; a plurality of parallel links pivotally connected with the member and the rail, the said member being formed of angle iron to receive the links and rail when the carrier is collapsed; and a lifter pivoted on the member for raising the collapsed links and rail therefrom into a position where they may be readily grasped by the hands of an operator.

2. A luggage carrier including a pair of straps adapted to be secured to the underside of an automobile running board; a supporting member; a pair of arms offset intermediate of their ends and pivotally connected with the straps and the member, the offset portions of the arms forming stops to limit the movement of the member in one direction; a collapsible rack carried by the supporting member; and springs, each having one end connected with a strap, and the other end connected with the supporting member to tend to retain the latter in engagement with the said stops.

3. A luggage carrier comprising a supporting member; a rail; a plurality of parallel links pivotally connected with the member and the rail, the said member having vertical and horizontal flanges forming a receptacle for the rail and parallel links when the carrier is collapsed; a pair of substantially Z shaped arms having the upper horizontal portions thereof adapted to be pivoted on the underside of an automobile running board and having the lower horizontal portions pivotally connected with the horizontal flange of the supporting member, the said construction of the arms permitting the supporting member to swing in a horizontal plane below the running board until it engages the vertical portions of the arms when the carrier is collapsed or until the links engage the outer edge of the running board when the carrier is extended; and spring means tending to move the supporting member to a position beneath the running board.

4. A luggage carrier comprising a supporting member; a rail; a plurality of parallel links pivotally connected with the member and the rail, the said member having vertical and horizontal flanges forming a receptacle for the rail and parallel links when the carrier is collapsed; a pair of substantially Z shaped arms having the upper horizontal portions thereof adapted to be pivoted on the underside of an automobile running board and having the lower horizontal portions pivotally connected with the horizontal flange of the supporting member, the said construction of the arms permitting the supporting member to swing in a horizontal plane below the running board until it engages the vertical portions of the arms when the carrier is collapsed or until the links engage the outer edge of the running board when the carrier is extended, the vertical portions of the arms being bent obliquely to the direction of the length of the said arms to provide a maximum bearing surface for engagement by the supporting member; and spring means tending to move the supporting member to a position beneath the running board.

5. A collapsible luggage carrier adapted to be mounted on the running board of an automobile and provided with a rail; means for securing one end of the rail to a part of the automobile; a guard comprising a bar having a hook on one end thereof for detachable connection with the rail and having the end remote from the hook bent at right angles to the bar; a bolt carried by the rail, the bent end of the bar being bifurcated for engagement by the bolt; and a loop carried by the rail for supporting the bar adjacent the corner of its bent end the bar being supported in its operative position by the loop and bolt and in its inoperative position by the loop and hook.

Signed at Toronto, Canada, this 27th day of January, 1930.

ALBERT HARRIS.